(12) United States Patent
Antonov et al.

(10) Patent No.: US 7,340,723 B2
(45) Date of Patent: Mar. 4, 2008

(54) IDENTIFIER IMPLEMENTATION MAPPING AND METHODS OF USING NAMESPACES

(75) Inventors: Michael Antonov, Highland, MD (US); Brendan Iribe, Highland, MD (US)

(73) Assignee: Scaleform Corporation, Greenbelt, MD (US)

( * ) Notice: Subject to any disclaimer, the term of this patent is extended or adjusted under 35 U.S.C. 154(b) by 680 days.

(21) Appl. No.: 10/611,051

(22) Filed: Jul. 2, 2003

(65) Prior Publication Data
US 2005/0005260 A1    Jan. 6, 2005

(51) Int. Cl.
G06F 9/44    (2006.01)
(52) U.S. Cl. .................................. 717/116; 717/114
(58) Field of Classification Search ................ 717/116, 717/165
See application file for complete search history.

(56) References Cited

U.S. PATENT DOCUMENTS

| | | | |
|---|---|---|---|
| 5,613,117 A * | 3/1997 | Davidson et al. ........... 717/144 |
| 6,083,282 A * | 7/2000 | Caron et al. ................. 717/101 |
| 6,993,744 B2 * | 1/2006 | Hills ........................... 717/108 |
| 7,065,742 B1 * | 6/2006 | Bogdan ....................... 717/106 |
| 2003/0101195 A1 * | 5/2003 | Linhart ........................ 707/102 |
| 2003/0101434 A1 * | 5/2003 | Szyperski .................... 717/120 |

* cited by examiner

Primary Examiner—Tuan Dam
Assistant Examiner—Michael Yigdall
(74) Attorney, Agent, or Firm—McKenna Long & Aldridge LLP (57) ABSTRACT

A method of mapping abstract identifier implementations organized into namespaces may be used by parties (e.g., software developers) to combine identifier implementations with maximum flexibility, producing high-performance abstract code tailored to different application requirements and host binding environments. By expressing a bound entity via a parenthetical construct, multiple different implementations of the same abstract identifier can be uniquely identified and coexist together within the same program. A similar technique can also be used to uniquely identify extensions to existing types and namespaces developed by external parties without causing binding name clashes.

39 Claims, 3 Drawing Sheets

Figure 1

Abstract Identifiers

```
namespace Geometry { virtual class Coord;
virtual class Point;
virtual class Size;
virtual class Rect;
}
```

Implementation 1: StandardGeometry

```
namespace StandardGeometry {
implement Geometry { class Point
    {
    Coord x, y;

Point(Coord _x, Coord _y)
        { x = _x; y = _y; }
    } class Size
    {
    Coord w, h;

Size(Coord _w, Coord _h)
        { w = _w; h = _h; }

Coord GetArea() const
        { return w * h; }
    } class Rect
    {
    Coord    left, top;
    Coord    right, bottom;

Rect(Coord l, Coord t, Coord r, Coord b)
        { left=l; top=t; right=r; bottom=b; }

Size    GetSize() const
        { return Size(right-left, bottom-top); }
    }
}
}
```

Implementation 2: DebugGeometry

```
namespace DebugGeometry {
implement Geometry { class Point
    {
    Coord x, y;

Point(Coord _x, Coord _y)
        {
        x = _x; y = _y;
        StdOut.Print("Point(%d,%d)", x, y);
        }
    } class Size
    {
    Coord w, h;

Size(Coord _w, Coord _h)
        {
        w = _w; h = _h;
        StdOut.Print("Size(%d,%d)", w, h);
        }
    Coord GetArea() const
        {
        StdOut.Print("Size.Area %dx%d = %d",
                     w, h, w*h);
        return w * h;
        }
    } class Rect
    {
    Coord    left, top;
    Coord    right, bottom;

Rect(Coord l, Coord t, Coord r, Coord b)
        {
        left=l; top=t; right=r; bottom=b;
        StdOut.Print("Rect(%d,%d, %d,%d)",
                     l, t, r, b);
        }
    Size    GetSize() const
        {
        StdOut.Print("Rect.Size %dx%d",
                     right-left, bottom-top);
        return Size(right-left, bottom-top);
        }
    }
}
}
```

```
implement Geometry        = StandardGeometry;
implement Geometry.Coord  = float;
using Geometry;

Coord    RectArea(Point p1, Point p2)
    {
    Point.Coord x1 = min(p1.x, p2.x),
                x2 = max(p1.x, p2.x),
                y1 = min(p1.y, p2.y),
                y2 = max(p1.y, p2.y);

Rect r(x1,y1, x2, y2);

return r.GetSize().GetArea();
    }
```

IDENTIFIER IMPLEMENTATION MAPPING AND METHODS OF USING NAMESPACES

BACKGROUND OF THE INVENTION

1. Field of the Invention

The present invention relates to namespaces and abstract identifiers located within namespaces. Particularly, the present invention relates to the use of identifiers and namespace names to uniquely identify implementations of abstract identifiers, to the use of namespaces and unique identifier names to organize code without encountering binding name clashes, and to the mapping of identifier implementations from source namespaces to host namespaces or host program scopes thereby enabling the formation of different binding environments.

2. Discussion of the Related Art

A problem typically encountered in using related art programming languages such as C is that it is often difficult to generate new names capable of uniquely identifying entities when a program reaches a certain size and/or when a program is broken up into pieces that are built and/or maintained by different users. Related art programming languages such as C generally have a single arena where all the identifier and function names are located. Accordingly, program developers must be careful not to accidentally use the same names in situations where they can conflict or clash. Exercise of such caution can, however, become prohibitively tedious, time-consuming, and expensive.

Accordingly, related art programming languages such as C++ include a mechanism to reduce such naming clashing by creating a namespace, wherein a namespace is a set of names in which all names are unique. Namespace declarations may, for example, consist of the keyword "namespace" followed by a qualified namespace name and body, for example.

```
namespace qualified_name
{
    declarations_in_namespace
}
```

Namespace declarations may occur as top-level declarations of a compilation unit or be nested within other namespaces. Further, there may be any declarations for a given namespace and identifiers of all types of declarations may be combined within one namespace.

In related art programming languages, the qualified name of a namespace identifies the namespace being declared. Traditionally, an unqualified name may, for example, be "apple" while a qualified name is formed out of multiple name strings separated by a delimiter (i.e., a character or group of characters) such as a dot ".". An instance of a qualified name might, for example, be "edible.firm.round.apple". Applied to namespaces, the declaration:

```
namespace N1.N2
{
    class A { }
}
``` is semantically identical to the declaration:

```
namespace N1
{
    namespace N2
    {
        class A { }
    }
}
```

Namespaces may be open-ended. Therefore, the following two declarations:

```
namespace N
{
    class A { }
}
``` and

```
namespace N
{
    class B { }
}
``` are equivalent to the single declaration:

```
namespace N
{
    class A { }
    class B { }
}
``` even if both original namespace declarations are located in different compilation units.

As evidenced above, related art programming languages allow identifiers within a namespace to have qualified names and be accessed with the help of the delimiter ".". For example, identifier "val", located in a namespace N2, nested in namespace N1, may be globally accessed as "N1.N2.val". Such access is illustrated in the following example:

```
namespace N1.N2
{
    int val;
}
void func( )
{
    int v = N1.N2.val;
}
```

Inside a nested namespace, related art programming languages allow identifiers declared in their enclosing namespaces to be accessible with unqualified names. These identifier visibility rules may be illustrated by the following example:

```
int outer;
namespace N1
    {
    int middle;
    int two;
    namespace N2
        {
        int one;
        }
    namespace N3
        {
        int two;
        void func( )
            {
            int i1 = outer;     // Ok, surrounding scope
            int i2 = middle;    // Ok
            int i3 = N1.middle; // Ok, i3 has the same value as i2
            int i4 = one;       // Error! 'one' is nested in
                                   namespace N2
            int i5 = N2.one;    // Ok, N2 is enclosed in the
                                   namespace N1, so we can access
                                   it
            int i6 = two;       // Ok, accesses N3.two - nested scope
                                // declaration hides outside
                                   declarations
            int i7 = N1.two;    // Ok, accessed N1.two
            }
        }
    }
```

Accordingly, the scope of an identifier's the set of all declaration spaces within which it is possible to refer to that name without qualification. In the example above, declarations within the nested scope hide declarations in outer scopes for the purpose of unqualified access.

As mentioned above, namespaces can allow identifiers to be uniquely named, thereby reducing the possibility of name clashes. However, without a common naming agreement, binding name clashes can still occur when integrating separately written code in related art programming languages. Further, related art programming language constructs do not provide a mechanism for efficient mapping of identifier implementations defined within one namespace to other namespaces requiring these implementations. The lack of such a mapping mechanism also means that the related art programming languages do not allow different binding environments for the same set of identifiers to be established within different program scopes or within different namespaces. As a result, programs written in the related art programming languages are effectively restricted to a single static binding configuration. It was this understanding and recognition of the problems with the related art programming languages that formed the impetus for the present invention.

SUMMARY OF THE INVENTION

The present invention is directed to methods of using identifier implementation mapping and namespaces that substantially obviate one or more of the aforementioned problems due to limitations and disadvantages of the related art.

An advantage of the present invention provides a method of uniquely identifying namespaces and identifiers statically bound within namespaces, thereby substantially minimizing the occurrence of binding name clashes within a development environment while allowing different bindings of the same identifier to be uniquely expressed.

Another advantage of the present invention provides a method of extending existing types by external parties, such that extension identifiers behave identically to original type member identifiers without causing binding name clashes.

Another advantage of the present invention provides a method of mapping identifier implementations that can be used to set up different mix-in binding environments, allowing for classes and program elements to be built with maximum efficiency, flexibility, and reusability.

Additional features and advantages of the invention will be set forth in the description which follows and, in part, will be apparent from the description or may be learned by practice of the invention. These and other advantages of the invention will be realized and attained by the structure particularly pointed out in the written description and claims well as the appended drawings.

To achieve these and other advantages, and in accordance with the purpose of the present invention, as embodied and broadly described, a method of uniquely expressing an implementation-bound identifier may, for example, include providing a first namespace; providing a second namespace different from the first namespace; providing a qualified name of an abstract identifier (i.e., a fully qualified identifier that can potentially have multiple implementations) declared by the first namespace; and generating a bound identifier of the abstract identifier, wherein the bound identifier comprises the qualified name of the first identifier and a name of the second namespace, such that the abstract identifier is bindable in the scope defined by the second namespace.

In another aspect of the present invention, a method of mapping implementations of virtual identifiers into a host namespace may, for example, include providing a mask comprising at least one virtual identifier; determining the qualified name of the at least one virtual identifier; providing at least one implementation source defining at least one implementation each for a corresponding one of the at least one virtual identifier; and, within the host namespace, statically binding the virtual identifier to the corresponding one of the least one source implementation defined by the at least one source.

In yet another the present invention, an identifier naming system may, for example, include at least one abstract identifier of a first identifier declared by a first namespace, wherein the at least one abstract identifier is bindable within a second namespace, different from the first namespace.

In still another aspect of the present invention, an identifier implementation mapping mechanism, implemented in at least one of a computer program, a runtime environment, and a database, may, for example, include both a mask comprising at least one virtual identifier derived from at least one of a plurality of identifiers and a host namespace for uniquely identifying a predetermined implementation of the at least one virtual identifier.

In another the present invention, a method of applying a "using" construct or the like that extends the visible identifier set of the host program scope may cause certain identifiers within the specified visible identifier set to become accessible as members of other scopes referenced by the qualified names appearing within the host program scope.

In another the present invention, a program development environment may, for example, include an application program interface capable of selectively mapping implementations of components from at least one selected from the group of independent application programs and libraries in real time to a common namespace.

In yet another the present invention, a method of implementing identifiers belonging to the existing namespaces may, for example, include providing a declaration of at least one identifier within at least one existing namespace; implementing at least one identifier within a second namespace, wherein the second namespace is different from the at least one existing namespace; and binding the at least one identifier declared within the at least one existing namespace to an implementation of the second namespace, wherein the at least one identifier declared within the at least one existing namespace is extendible by the at least one identifier declared within the second namespace. Accordingly, newly created identifiers may extend existing identifiers even when the newly created and existing identifiers are declared within diverse namespaces.

Moreover, an implementation of a type or namespace within a newly created host namespace may introduce features (e.g., new types, identifiers) into existing namespaces. These new features may be considered extensions of the existing namespace and can be uniquely identified by generating fully qualified, parenthetically constructed unique names including the name of the host namespace, the abstract identifier, and the name of the newly created feature bound in the resultant scope.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 illustrates how the abstract identifiers that have multiple implementations can be referenced from code;

DETAILED DESCRIPTION OF THE ILLUSTRATED EMBODIMENTS

Reference will now be made in detail to embodiments of the present invention, examples of which are illustrated in the accompanying drawings.

According to the principles of the present invention, a method of mapping abstract identifier implementations organized into namespaces may be used by parties (e.g., software developers) to combine identifier implementations with maximum flexibility, producing high performance abstract code tailored to diverse application requirements and host binding environments. In one aspect of the present invention, a bound entity may be expressed via a parenthetical construct. Accordingly, many different implementations of the same abstract identifier may be uniquely identified and coexist together within the same program. In accordance with the principles of the present invention, parenthetical constructs may also be used to uniquely identify extensions to existing types and namespaces developed by external parties without causing binding name clashes.

According to the principles of the present invention, identifiers may be organized within conceptual units called namespaces, types, classes, objects, or other structures. Since a namespace is essentially a set of names that are all unique, types, classes, objects, and other structures may also be considered and are, hereinafter, referred to as namespaces. Identifiers may refer to names given to entities used within a program, runtime environment, database, etc. Further, identifiers may be characterized as text strings, unique binary keys, or substantially any other qualified or unqualified data structure having substantially any format capable of being associated with implementations or values. An implementation may comprise a value or meaning, such as numeric value, function, class, or any other data structure capable of being associated with identifiers.

As mentioned above, namespaces generally can be identified via a qualified form of the namespace's name. As shown above, related art language constructs typically provide a qualified name as a series of identifiers separated by periods, wherein the identifier provided on the right side of a period is resolved within the declaration space specified by the identifier provided on the left side of the period. A qualified name of an identifier or a namespace is a name containing the names of all the namespaces it is nested in.

According to the principles of the present invention, however, a parenthetical construct may be used to form a fully qualified name from an existing qualified name. The parenthetical construct may, for example, include parenthesis, braces, or substantially any other equivalent representation (e.g., a tree structure) and enable qualified names to be nested within existing qualified names. For example, within the fully qualified name "Graphics.Shapes.(MyCompany.Circle)", "(MyCompany.Circle)" is the parenthetical construct and "MyCompany.Circle" is the nested qualified name.

According to the principles of the present invention, "MyCompany.Circle" may be characterized as an abstract identifier, and the fully qualified name "Graphics.Shapes.(MyCompany.Circle)" may uniquely identify a particular instance, or implementation, of the abstract identifier "MyCompany.Circle". Applying the concept of parenthetically constructed, fully qualified names of the present invention to the example provided in the "Discussion of the Related Art" section above, the qualified name "N1.N3.two", obtained through conventions of the related art, may be equivalently expressed by introducing at least one parenthetical construct into the existing qualified name. Accordingly, applying the parenthetical construct naming scheme to the qualified name "N1.N3.two", a more complete, fully qualified name such as "N1.N3.(N1.N3.two)" or "N1.(N1.N3).(N1.N3.two)" may be obtained. Therefore, according to the principles of the present invention, the following two statements are equivalent:

int v=N1.N3.two;

int v=N1.N3.(N1.N3.two);

Here, the nested qualified name "N1.N3.two", in the second expression provided above, may be characterized as the abstract identifier and the fully qualified name "N1.N3.(N1.N3.two)" characterized as uniquely identifying a particular implementation of the abstract identifier "N1.N3.two". Thus, the abstract identifier "N1.N3.two" is bound within the scope of "N1.N3", wherein "N1.N3" is characterized as the binding scope of the abstract identifier "N1.N3.two". As the binding scope of the abstract identifier "N1.N3.two", the namespace "N1.N3" provides the source of a particular implementation of the abstract identifier "N1.N3.two". According to the principles of the present invention, the abstract identifier is actually the qualified name of the integer declaration "two". Therefore, the first two components of the abstract identifier "N1.N3.two" indicate where the integer declaration was originally created (e.g., the originating namespace). In the fully qualified name "N1.N3.(N1.N3.two)", the binding scope "N1.N3" and the originating namespace are syntactically the same, causing the parenthetical construct to be redundant. Further the source namespace "N1.N3" and the originating namespace (i.e., "N1.N3", within the abstract identifier "N1.N3.two") are identical, and no real change in implementation of the abstract identifier "N1.N3.two" is produced. However, the implementation for the integer declared by abstract identifier "N1.N3.two" may be provided within a syntactically different namespace (i.e., a namespace not syntactically a part of the namespace "N1.N3") named, for example, "M" in, for example, the declaration "M.(N1.N3.two)".

As shown above, the introduction of parenthetical constructs within qualified names may provide a means of structurally and syntactically expressing the concept that a nested identifier is bound within the scope of another identifier. More specifically, parenthetical constructs may be used to create fully qualified names from any existing qualified name and identify a particular implementation of an abstract identifier. In one aspect of the present invention and as discussed later on in paragraph [0068], implementations of abstract identifiers may be mapped between namespaces that may or may not be syntactically a part of the qualified name in the abstract identifier. Accordingly, parenthetically constructed, fully qualified names provide the means of uniquely identifying implementations of abstract identifiers that are residing or bound within such syntactically different namespaces.

In one aspect of the present invention, uniquely identifying namespaces and identifiers with the naming convention of the present invention enables parties to provide uniquely identifiable implementations of identifiers managed by other parties by declaring them within their own namespace or program scope (i.e., host the namespace or program scope). Applying the concepts of the present invention, the exemplary declaration:

```
namespace X.Core
{
    virtual int a;
    virtual int b;
}
``` declares two identifiers traditionally identified using qualified names "X.Core.a" and "X.Core.b". These identifiers may be characterized as being globally unique names identifying a particular concept or meaning given by the programmer to "a" and "b", initially created within the originating namespace "X.Core". The implementation of the identifier identified using the traditionally qualified name "X.Core.a", however, may potentially be different from the implementation of the identifier identified by the corresponding abstract identifier of the parenthetically constructed, fully qualified equivalent name "X.Core.(X.Core.a)" or "X.(X.Core).(X.Core.a)". Accordingly, the fully qualified name "X.Core.(X.Core.a)" identifies a specific implementation of the abstract identifier "X.Core.a" that is actually located within the originating namespace "X.Core". Similar to the example above, the binding scope "X.Core", providing the source of the particular implementation of the abstract identifier "X.Core.a" and the originating namespace "X.Core", as identified by the abstract identifier, are syntactically the same, causing the parenthetical construct to be redundant. Further, there is no real change in implementation of the abstract identifier "X.Core.a" because the source namespace ("X.Core") and the originating namespace ("X.Core" as identified within the abstract identifier) are identical. Accordingly, the traditional namespace syntax "X.Core.a" only allows for the abstract identifier "X.Core.a" to be defined within its originating namespace "X.Core". By applying the parenthetically constructed, fully qualified naming scheme of the present invention, however, implementations of the abstract identifier "X.Core.a", other than that provided by the originating namespace "X.Core", could be provided within host namespaces such as "M.(X.Core.a)" that may or may not be syntactically the same as (e.g., a part of) "X.Core.(X.Core.a)" (or "X.(X.Core).(X.Core.a)").

For example, the nested abstract identifier "X.Core.a" may be looked up, defined, and bound within a host namespace (e.g., "M") via the following exemplary declaration:

```
namespace M.X.Core
{
    virtual int a;
}
```

The exemplary declaration provided above actually declares "M.X.Core.a" and, thus, has no relationship to the original declaration "X.Core.a". To create a relationship between the two declarations, the principles of the present invention enable either an explicit qualification or use a keyword, such as "implement", via the following respective declarations:

```
namespace M
{
    int X.Core.a;
}
``` or

```
namespace M
{
    implement X.Core
    {
        int a;
    }
}
```

Both of the above declarations are substantively identical in that they declare an implementation of the abstract identifier "X.Core.a" within a host namespace "M". However, use of the "implement" keyword may be convenient when multiple identifiers from particular namespaces need to be defined and bound. Thus, as indicated by the parenthetically constructed, fully qualified name "M.(X.Core.a)", the implementation of the abstract identifier "X.Core.a" is bound within the scope of host namespace "M". As the binding scope of the abstract identifier "X.Core.a", host namespace "M" also acts as the source namespace, providing the source of a particular implementation of the abstract identifier "X.Core.a" that may be different than the particular implementation provided by the originating namespace "X.Core", as identified by the abstract identifier "X.Core.a".

As seen be seen from the discussion above, the principles of the present invention may be applied to efficiently separate original conceptual meanings of identifiers given by programmers from their implementations within originating namespaces or scopes. Accordingly, multiple implementations of the same abstract identifier, located within different namespaces or scopes, may coexist within the same program or runtime environment. By providing fully qualified, parenthetically constructed names, different implementations of the same abstract identifier may be uniquely identified. For example, using parenthetically constructed, fully qualified names, unique names for multiple implementations of "N1.N3.two" could be "M.(N1.N3.two)", "A.(N1.N3.two)", "D.(N1.N3.two)", and so on.

According to the principles of the present invention, all abstract identifiers may be statically bound within a host scope or namespace. Further, all abstract identifiers may have multiple, different implementations. Statically bound abstract identifiers may be accessed directly by name, making them easier to use and more efficient than, for example, dynamically bound identifiers.

According to the principles of the present invention, all nested scopes inherit identifier definitions from outside scopes. Accordingly, if the abstract identifier "x.Core.a" is defined within, and bound to the scope of, host namespace "M", as shown above, the definition of the abstract identifier "x.Core.a" will be referenced by all of the scopes (nested namespace, function, class declarations, etc.) of host namespace "M" is completely re-defined in terms of the namespace providing the source of the implementation (in this case, the host namespace "M").

It should be noted that, even though a definition may be accessible, the definition may not necessarily be useable because the definition may be restricted by particular bindings within the host namespace. For example, a local member variable "var" located in class "C" may not always be usable directly within a nested class because it may require, for example, a "C.this" parameter not available by default. A user may, however, re-define "C.this" inside the nested class and either statically bind it to a value taken from, for example, class binding scope (a.k.a. "bindsite") or initialize it in a constructor by taking the value as an implicit value parameter from, for example, invoke scope (a.k.a. "callsite").

The parenthetically constructed, fully qualified names of the present invention may be applied to naming schemes similar to those defined by related art programming languages such as Java. Name clashing in related art programming languages may be reduced by using a particular Internet domain name (or other name to which an organization belongs) to form the unique namespace to which their identifiers will belong. Accordingly, in the case of an internet domain name, the "www" prefix of the domain name may be discarded and the order of the remaining name may be reversed to form the unique namespace name. For example, a unique name of a user belonging to an organization having an exemplary domain name www.SomeCo.com would, for example, be "Com.SomeCo". It may be the responsibility of the domain name owner to organize its own namespaces. Accordingly, if a programmer working at company www.SomeCo.com wants to develop a matrix library, the following namespace may, for example, be declared:

```
namespace Com.SomeCo.MatrixLib
{
    class Matrix { }
}
```

Up to this point, the aforementioned related art naming scheme has proven sufficient in preventing naming clashes. However, parties may be interested in extending types and namespaces that have been declared by other parties. Suppose, for example, SomeCo provides a draw surface declaration type containing methods such as Line( ), Rectangle( ), and so on, via the following:

```
namespace Com.SomeCo.Draw
{
    type Surface
    {
        void Line(int x1, int y1, int x2, int y2);
        ...
    }
}
```

An external party (e.g., AnotherCo) providing a specific implementation of "Surface" interested in adding features to the aforementioned SomeCo "Draw.Surface" interface but are unable to do so because they do not directly control the originating SomeCo namespace. Related art solutions to this impasse have generally required defining and implementing an entirely new type, in addition to "Draw.Surface". Such related art solutions, however, prohibitively inconvenience users by forcing them to use typecasts and to create extensions not easily integrated with available libraries.

Accordingly, the principles of the present invention may be used to overcome the aforementioned related art problems by extending namespaces, classes, types, etc., and allowing AnotherCo to implement the aforementioned "Draw.Surface" type originated by SomeCo and add a new feature called, for example, "Curves" to it. This may be done by the following exemplary declaration:

```
namespace Com.AnotherCo.Draw
{
    implement Com.SomeCo.Draw.Surface
    {
        // Add a type to the surface
        open type Curves
        {
            void Bezier(Point *points, int count);
        }
    }
}
```

The example above defines three types (the third entry is added because type Curves is open):
Com.AnotherCo.Draw.(Com.SomeCo.Draw.Surface).Curves
Com.AnotherCo.Draw.(Com.SomeCo.Draw.Surface).Curves.Bezier
Com.AnotherCo.Draw.(Com.SomeCo.Draw.Surface).Bezier
where "Curves", "Curves.Bezier", and "Bezier" are three new features added to the "Surface" interface. Unlike the "Surface" interface, which was originally declared within the "Com.SomeCo.Draw" namespace, the new features are externally declared within another, syntactically different namespace, "Com.AnotherCo.Draw".

If SomeCo later adds its own version of "Curves" into "Com.SomeCo.Draw.Surface", the resulting fully qualified name of the new feature would be "Com.SomeCo.Draw. Surface.Curves", which is equivalent to "Com.SomeCo. Draw.Surface.(Com.SomeCo.Draw.Surface.Curves)". Introduction of this fully qualified name will not generate any link-time name clashes because the fully qualified name "Com.SomeCo.Draw.Surface.(Com.SomeCo.Draw.Surface.Curves)" is different from "Com.AnotherCo.Draw. (Com.SomeCo.Draw.Surface).Curves". The code using the AnotherCo extension may still use AnotherCo's "Curves" interface while the SomeCo users may refer to their own new version of "Curves".

Similar to the way the "Draw.Surface" type originated by SomeCo was extended with the "Curves" feature of AnotherCo, the "Curves" feature, itself, can be further extended by ThirdCo. ThirdCo may, for example, add cubic curves support to "Curves" by extending it with the "Cubic" type:

```
namespace Com.ThirdCo.Draw
{
  implement Com.SomeCo.Draw.Surface
  {
    implement Com.AnotherCo.Draw.(Com.SomeCo.Draw.Surface).
    Curves
    {
      type Cubic
      {
        // new functions, etc..
      }
    }
  }
}
``` where the newly introduced "Cubic" type has a fully qualified name "Com.ThirdCo.Draw.(Com.AnotherCo. Draw.(Com.SomeCo.Draw.Surface).Curves). Cubic". As can be seen, the use of the parenthetical construct in conjunction with the unique naming scheme of the current invention allows type extensions to be arbitrarily nested and uniquely identified.

According to the principles of the present invention, and, as mentioned above, any unique identifier can be bound or looked up within any other namespace. The type named "Com.AnotherCo.Draw.(Com.SomeCo.Draw.Surface). Curves" can, therefore, be looked up within any scope, including the scope providing an implementation of "Com. SomeCo.Draw.Surface". Accordingly, the extension function "Bezier" declared above may, for example, be called by AnotherCo as follows:

Com.SomeCo.Draw.Surface *psurface=. . . ;
psurface->(Com.AnotherCo.Draw.
(Com.SomeCo.Draw.Surface).Bezier)(points,5);

Multiple techniques can be used to syntactically shorten the long, unique identifier names produced by the current invention's naming scheme. First, the programming language or environment may allow the parenthetical construct appearing within external feature names to be dropped if the feature-declaring namespace does not implement any other identically named features within other types. Because of this simplification, the function call presented above can be shortened to:

psurface->(Com.AnotherCo.Draw.Bezier)(points,5);

Furthermore, such long names may also be shortened with "using" directives:

using Com.SomeCo.Draw;
using Com.AnotherCo.Draw;
Surface *pSurface=. . . ;
pSurface->Bezier(points,5);

In the example, above, the first using directive makes identifiers within the namespace "Com.SomeCo.Draw" visible, thereby allowing AnotherCo to access "Surface" without using a qualified name. The second directive brings in members of the "Com.AnotherCo.Draw", making "Bezier( )" directly visible.

According to the principles of the present invention, use of the second "using" directive presented above uniquely shortens the qualified names from within the qualified name string. Traditionally, related art programming languages apply the "using" directives to only shorten the qualified names from the beginning of the qualified name string, thereby eliminating long prefixes that may be required due to deep namespace nesting of the referenced identifier. According to the principles of the present invention, however, the "using" construct may be applied to components of nested qualified names, thereby shortening nested qualified names within the program text. This unique utilization of the "using" construct allows for external type extensions to behave identically to the original components of the type.

In related art programming languages, if SomeCo later adds its own "Bezier" function to the "Surface" type described in the example above, an error may likely result because the compiler is no longer sure about which function to invoke. Accordingly, a parenthetically constructed, fully qualified naming scheme of the present invention may be used to solve this problem, giving every add-on feature a fully qualified name.

In one the present invention, the parenthetical constructs may be used to equivalently identify extensions developed by different program developers. For example, extensions from different developers to class "Point" may be represented as:

Com.SomeCo.Core.Types2D.(Point).Name
Com.AnotherCo.Types2D.(Point).Name

In the example above, both extensions have the same member ("Name") accessible in "Point", but are, nevertheless, different. Conventionally, these two extensions cannot be uniquely expressed linearly because extensions can be added to other extensions, as described above in paragraph [0058]. Accordingly, the parenthetical construct of the present invention allows diverse parties to add functionality to existing classes and types.

As already mentioned above, types and classes may be classified as namespaces. Accordingly, and as described above, the parenthetical construct of the present invention allows types and classes, in addition to namespaces, to contain identifiers that may or may not syntactically belong to them. Identifiers not syntactically belonging to a namespace may correspond to virtual entities declared elsewhere and belonging to another namespace (originating namespace, another host namespace). In one the present invention, implementations for any number of such virtual identifiers (i.e., abstract identifiers) may be mapped using a single statement in a namespace mapping mechanism. Accordingly, multiple actual implementations for groups of potentially related virtual identifier declarations may be conveniently mixed and matched using the principles of the present invention.

In one aspect of the present invention, mapping mechanisms comprising statements such as "implement" and the like may enable the local overriding of identifiers. In another aspect of the present invention, and as will be described in greater detail below, such mapping mechanisms may provide a means of mixing and matching implementations of at least one identifier external to a user's host namespace. In still another the present invention, such mapping mechanisms may include an implementation mask containing at least one identifier having an implementation to be mapped. In yet another aspect of the preset invention, implementations of identifiers within the implementation mask may be mapped to an implementation provided in a source namespace or the like.

In accordance with the principles of the present invention, a namespace within a software architecture, programming language, or runtime environment may be considered, at least in part, as an identifier that may be included within the implementation mask. Identifiers within the implementation mask may be characterized as a group of logically related identifiers or other plurality of identifiers organized within a namespace or other hierarchical structure. In one aspect of the present invention, elements of an implementation mask may comprise entities (e.g., types, objects, functions, classes) declared within the namespace. Identifiers included within the implementation mask may also be created out of other identifiers via predetermined logical set operations such as + (union), & (intersection), − (difference), unary ~ (inverse), exclusive, and the like.

In one the present invention, an "implement"-type statement may have the following form:

implement mask=source;

wherein the generic identifier "mask" may identify the implementation mask while the generic identifier "source" may refer to a uniquely identified source namespace capable of providing implementations for the identifiers within the implementation mask. In one the present invention, the generic identifier "source" may refer to an external expression that can be evaluated and that is capable of locally accessing visible identifiers that are capable of providing implementations for the identifiers within the implementation mask.

In one the present invention, only implementations of identifiers within the implementation mask are mapped from the source namespaces to the host namespace or scope. In another aspect of the present invention, the "implement"-type statements are found within the host namespace or scope. Using the mapping mechanism of the present invention, implementations of identifiers within the implementation mask may be mapped according to the implementations provided by the "source" and be brought into the host namespace as static parameters. Accordingly, namespaces may effectively be used as implementation mapping mechanisms via the aforementioned "implement"-type statement.

In one aspect of the present invention, the exemplary statement:

implement x.Core−
    x.Core.FloatingPoint=MyCoreImpl;

implicitly maps implementations of all virtual identifiers declared within the implementation mask (i.e., identifiers in the "x.Core" namespace except for those located in the "x.Core.FloatingPoint" namespace, nested within X.Core) to the implementation provided by the source namespace "MyCoreImpl".

In another example, a simple output device, capable of providing a single function (e.g., displaying a string), may be defined. A virtual instance of the simple output device may be defined as "Test.Out".

```
namespace Test
{
    type TOutput
    {
        void Print(String s);
    }
    virtual class OutputDevice : TOutput;
    virtual OutputDevice Out;
}
```

Next, a function may be provided to reference "Test.Out" and display a string to it. For example:

```
using Test;
int SayHi( )
{
    Out.Print("Hello world\n";
}
```

The function "SayHi( )" displays a message by referencing a specific "OutputDevice" instance without directly binding to it. Instead, the function accesses the specific "OutputDevice" instance though a virtual slot "Test.Out". This is somewhat similar to the use of header files in program languages such as C++ in that an entity is defined without providing an implementation. Unlike related art program languages such as C++, however, the principles of the present invention allow any number of implementations for "Test.Out" to coexist without clashing with each other. Accordingly, "Test.Out" may be viewed as an implicit template parameter for "SayHi".

In order for "SayHi( )" to be invoked, its surrounding scope must provide an implementation for it. First, an implementation is provided and put into namespace "Impl", for example:

```
namespace Impl
{
    implement Test
    {
        class OutputDevice : TOutput
        {
            void Print(String s)
            {
                // do something system-specific
            }
        }
        OutputDevice Out;
    }
}
```

Now a user can invoke "SayHi( )" by referencing the implementation first. The example below defines a class "C" having a member function Statement( ) invoking "SayHi".

```
class C
{
    implement Test = Impl;
    void Statement( )
    {
        SayHi( );
    }
}
```

As seen from the examples above, through the use of external declarations and implicit parameterization, the principles of the present invention allow development of the identifier implementation-independent code relying on the external declarations provided by host namespaces. Accordingly, the independent code may be statically bound to different implementations of a single declaration within different binding environments of host namespaces or scopes.

According to the principles of the present invention, implicit parameterization prevents parameters from having to be continually and explicitly specified. Through implicit parameterization, parameters may be taken directly from the host binding environment. Further, implicit parameterization allows developers to conveniently parameterize frameworks with respect to substantially all bindings, making frameworks cleaner, more flexible, easier to architect, and simpler to maintain.

Moreover, implicit parameterization solves the so-called 'pointer chain' problem experienced in related art OO languages, whereby objects often need to be accessed through multiple indirections of pointers or references stored in other objects. The pointer problem with related art programming languages effectively embeds class hierarchy into program, reducing general purpose nature of the code and violating a software engineering principle known as the Law of Demeter. According to the principles of the present invention, however, parenthetical construction of names may enable software developers to declare an abstract identifier, such as a virtual class or variable (property), and use its name directly in code instead of the corresponding pointer chain while providing only a single implementation of the abstract identifier in the host namespace or program scope.

As mentioned above, the unique naming convention of the present invention enables namespaces to be used as implementation mapping units. Implementation mapping units, in turn, may enable the mapping of implementations of identifier sets across namespaces or sources. Accordingly, implementations of selected components from diverse namespaces (e.g., application programs) may be selective mapped to new, externally defined host namespaces or other host environments. For example the principles of the present invention may be used to re-map diverse integer values via the following construct:

```
namespace MyNamespace
{
    include x.Core.int, x.Core.uint;
    include x.Numeric.WideInt, x.Numeric.WideUInt;
    // some other definitions may go here . . .
}
```

In one the present invention, the "include" keyword may reference an identifier (or a namespace) to make the identifier (or namespace) a member of a new namespace in addition to whatever namespaces it already belongs to. Considering the existence of the "MyNamespace" declaration above, the "x.Core.int" class map belong to at least three namespaces: "x", "x.Core", and "MyNamespace". The new namespace "MyNamespace" then may be used as an implementation mask wherein all implementations of identifiers within "MyNamespace" are mapped to the implementation provided by "MyCompany.MyIntegers" to a host namespace via the following:

implement MyNamespace=MyCompany.MyIntegers;

Including identifiers within a namespace does not automatically make them visible within the namespace itself. To make identifiers visible within the namespace, a keyword such as "open" used. For example:

```
namespace MyOpenTypes
{
    open x.Core;
    open x.Containers;
}
```

After this declaration, the statement
using MyOpenTypes;
has the same effect as
using x.Core;
using x.Containers;

Accordingly, keywords such as "open" viewed as a more powerful version of keywords such as "using". Keywords such as "using" enable identifiers to be temporarily visible within a given scope while "open" actually brings them into the scope. Given the declaration above, "x.Core.int" and "MyOpenTypes.int" refer to the same class.

In one the present invention, the type or namespace declaration may be prefixed by the "open" keyword. In addition to declaring a new namespace, such prefixing allows for all of its nested declarations to be visible in the external scope. Since keywords "include" and "open" have identical parameter syntax, they may be combined together. If necessary, the "include" and "open" statements can utilize the namespace set operators similar to the way that the "implement" statement does.

Accordingly, implementations of identifiers from diverse namespaces may be simultaneously mapped to a single host namespace or scope. Further, because of the unique naming convention using parenthetical constructs, as described above, any possibility of encountering binding name clashes is eliminated.

In another example, a host binding environment, in this case, a host namespace, may be provided as:

```
namespace A
{
    // Extended precision "long" classes are taken from
    Com.SomeCo.VM
    // implementation, while the floating point classes and
    // objects come from an external party, e.g., AnotherCo
    implement x.Core.Long        = Com.SomeCo.VM;
    implement x.Core.FloatingPoint = AnotherCo.SoftwareEmulation;
}
```

Accordingly, the principles of the present invention allow selected implementations of selected objects, classes, and other structures of diverse scopes (e.g., within namespaces, application programs) to be mapped to a single scope or namespace, statically binding them when done. Such implementation mapping may also be used to selectively delegate implementation of a class component to a different entity.

In another example applying the principles of the present invention, FIG. 1 illustrates how the abstract identifiers having multiple implementations can be referenced from code.

Referring to FIG. 1, the box labeled "Abstract Identifiers" may contain a declaration of the "Geometry" namespace that encloses declarations of four abstract identifiers (e.g., virtual classes "Coord", "Point", "Size", and "Rect"). Three of these classes (e.g., "Point", "Size", and "Rect") may have two distinct implementations located in the "StandardGeometry" and "DebugGeometry" namespaces.

Implementation methods within the "DebugGeometry" namespace may perform substantially identical tasks to those in the "StandardGeometry" namespace except that implementation methods within "DebugGeometry" may further display debug messages to StdOut. As mentioned in the examples above, the principles of the present invention permit multiple implementations of the same identifier to coexist within different scopes of the same program while allowing them to be statically bound (unlike virtual functions in C++, which must be members of a class and can only be dynamically bound). The box at the bottom of FIG. 1 illustrates an implementation mapping mechanism that determines how abstract identifiers within the "Geometry" namespace and their implementations may be selectively mapped to predetermined source namespaces.

The two implement statements appearing in the first two lines of the implementation mapping mechanism at the bottom of FIG. 1 establish a local binding environment by mapping "Geometry" identifiers to a particular implementation. For example, the first statement, reading: "implement Geometry=StandardGeometry;" may map all of the abstract identifiers in the "Geometry" namespace (used herein as the aforementioned implementation mask) to their implementation in the "StandardGeometry" namespace (used herein as the aforementioned source namespace). The two arrows graphically illustrate the connection between the namespace identifier names used in the implement statement and their associated namespace declarations. Note that no arrows reference the "DebugGeometry" namespace. In the example shown in FIG. 1, the "DebugGeometry" namespace is not used. As mentioned above, only implementations of identifiers within the implementation mask are mapped from the source namespace to the host namespace or scope. Accordingly, the "Geometry.Coord" identifier is explicitly mapped to be equivalent to the "float" class by the second statement reading "implement Geometry.Coord=float;".

Figure 2:
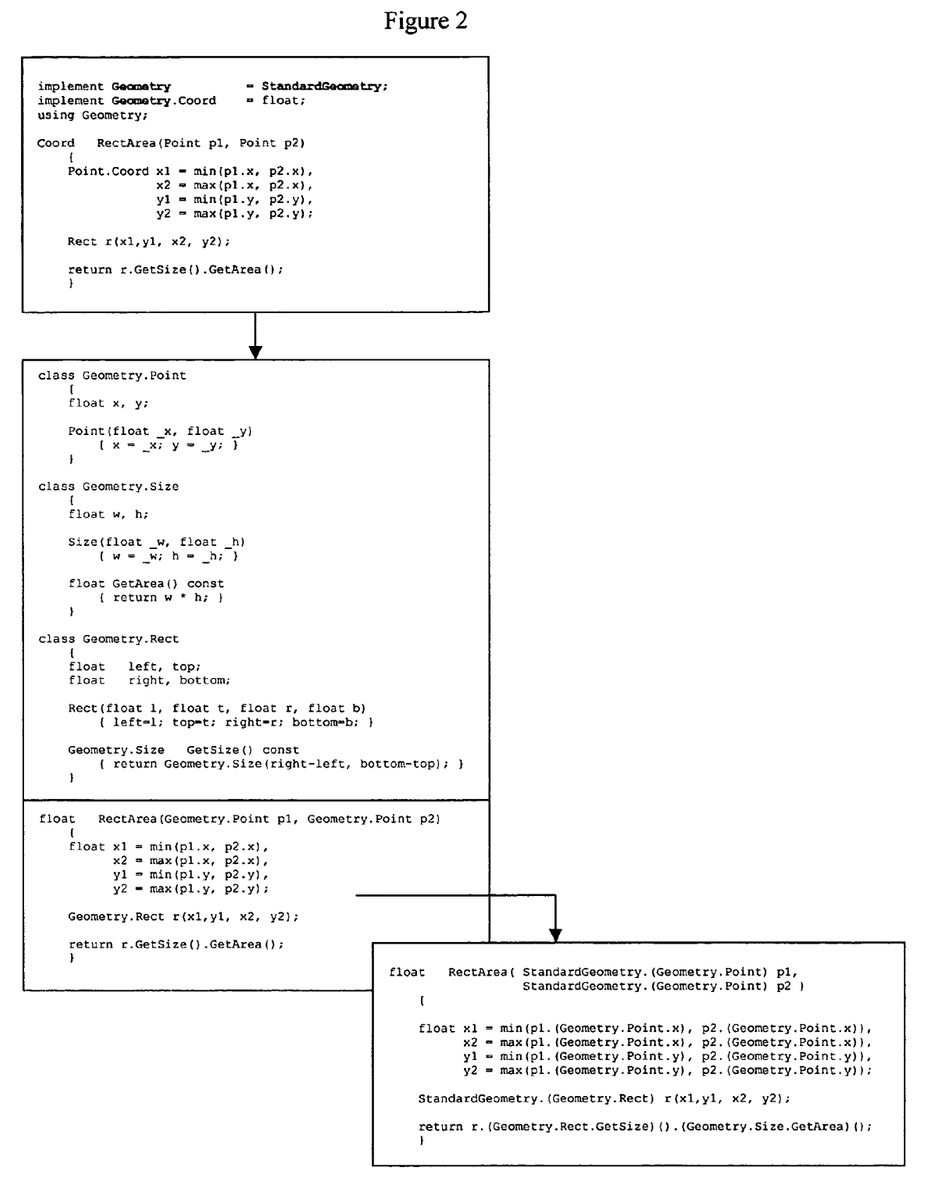
FIG. 2 illustrates how the implementation mapping mechanism shown at the bottom of FIG. 1 is interpreted once it is bound.

FIG. 2 illustrates how the implementation mapping set-up at the bottom of FIG. 1 is interpreted once it is statically bound.

Referring to FIG. 2, after the implementation mapping mechanism shown in FIG. 1 is bound, the identifier references within the implementation classes may be resolved and mixed into each other. Accordingly, the abstract identifiers "Geometry.Point", "Geometry.Size", and "Geometry.Rect", provided via the "Geometry" namespace, may be bound within the scope of the "StandardGeometry" namespace, wherein the "StandardGeometry" namespace is the source namespace providing particular implementations of the aforementioned abstract identifiers. All the references to "Geometry.Coord" may be replaced with the implementing class—"float". Similar replacements may be made within the "RectArea" function, which is defined locally within the same scope as the implementation mapping mechanism. The detailed, statically bound interpretation of the "RectArea" function is presented in the box on the bottom right of the drawing. As shown in FIG. 2 all of the references to abstract identifiers originally provided in the "Geometry" namespace have been replaced with statically bound implementations provided in the "StandardGeometry" source namespace (expressed via the aforementioned parenthetical construct) while all references to "Geometry.Coord" have been replaced with "float".

Figure 3:
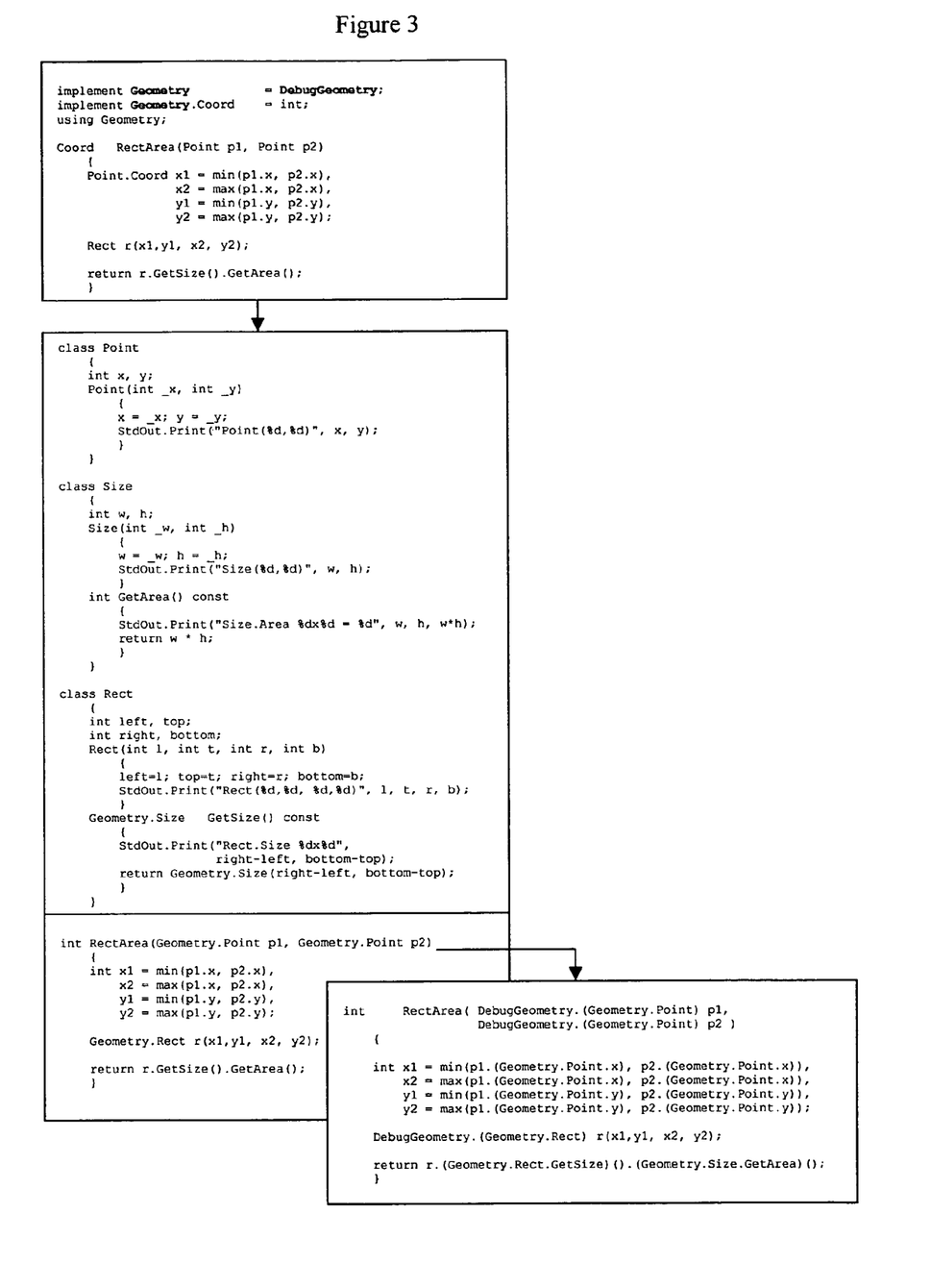
FIG. 3 illustrates the use of implementation mapping of the abstract identifiers within the "Geometry" namespace to the implementation provided by the "DebugGeometry" namespace.

FIG. 3 illustrates the use of implementation mapping of the abstract identifiers in the "Geometry" namespace shown in FIG. 1 to their implementation in the "DebugGeometry" namespace.

The only difference between FIG. 3 and FIG. 2 is that the abstract identifier implementations of the "Geometry" namespace are taken from the "DebugGeometry" namespace instead of the "StandardGeometry" namespace while the "Cometry.Coord" class is mapped to the "int" class instead of "float". The detailed, bound interpretation of the "RectArea" function is presented within the box on the bottom right of FIG. 3. As shown in FIG. 3, all of the references to abstract identifiers in the "Geometry" namespace have been replaced with their statically bound implementations in the "DebugGeometry" namespace (expressed via the aforementioned parenthetical construct) while all references to "Geometry.Coord" have been replaced with "int".

According to the principles of the present invention, the original conceptual meanings of identifiers given by programmers may be efficiently separated from their implementations within their originating namespaces or scopes. Subsequently, the identifiers may be looked up by, organized within, and bound to any namespace that may or may not be syntactically a part of the originating namespace. Accordingly, the principles of the present invention maximize the degree to which functionally and syntactically diverse implementations may be organized and combined with each other.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of uniquely expressing an implementation-bound identifier, the method implemented in a computer program, comprising:
providing a first namespace;
providing a second namespace having a host scope and a plurality of program scopes, wherein the second name space is different from the first namespace;
providing an abstract identifier of a first identifier declared by the first namespace, wherein the abstract identifier can have a plurality of implementations; and
generating a bound identifier of the abstract identifier, wherein the bound identifier comprises the qualified name of the first identifier and a name of the second namespace, wherein the abstract identifier is mix-in bindable in the scope defined by the second namespace, and wherein a bound implementation corresponding to the bound identifier is propagated into the plurality of program scopes that make use of the abstract identifier.

2. The method of claim 1, wherein the name of the second namespace is an unqualified name.

3. The method of claim 1, wherein the name of the second namespace is a qualified name.

4. The method of claim 1, wherein the abstract identifier includes the qualified name of the first identifier.

5. The method of claim 1, wherein the qualified name of the first identifier comprises a series of constituent identifiers.

6. The method of claim 5, wherein successive ones of the series of constituent identifiers are separated by a delimiter such that, with respect to each delimiter, successive ones of the constituent identifiers are bound within the namespace defined by preceding ones of the constituent identifiers.

7. The method of claim 1, wherein the first and second namespaces are syntactically the same.

8. The method of claim 1, wherein the first namespace comprises a first syntax; and the second namespace comprises a second syntax, different from the first syntax.

9. The method of claim 1, wherein a first implementation of the abstract identifier is definable by the first namespace.

10. The method of claim 9, wherein a second implementation of the abstract identifier, different from the first implementation, is definable by the second namespace.

11. The method of claim 1, wherein generating the bound identifier includes enclosing the abstract identifier in a parenthetical construct.

12. The method of claim 1, wherein a fully qualified name of the bound identifier comprises the abstract identifier separated from the name of the second namespace by a delimiter.

13. A method of mapping implementations of pre-declared virtual identifiers into a host namespace, comprising:
providing a mask having at least one virtual identifier originally declared to have multiple potential implementations;
providing at least one implementation source defining at least one implementation each for a corresponding one least one virtual identifier; and
within the host namespace, statically mix-in binding the at least one virtual identifier to the corresponding at least one source implementation defined by the at least one source, wherein the at least one implementation of the at least one virtual identifier corresponding to the host namespace is bound to a corresponding use of the at least one virtual identifier in any code referenced by the host namespace.

14. The method of claim 13, wherein the mask consists of a single identifier corresponding to at least one virtual identifier.

15. The method of claim 14, wherein the single identifier identifies the mask namespace, comprising at least one virtual identifier.

16. The method of claim 13, wherein the mask includes a first expression, the result of which evaluates at least one virtual identifier.

17. The method of claim 16, wherein the first expression includes a logical set operation applied to at least one other expression.

18. The method of claim 17, wherein a structure of the at least one other expression is substantially the same as the structure of the first expression.

19. The method of claim 17, wherein the logical set operation includes a union operation, which evaluates at least one virtual identifier by combining sets of virtual identifiers returned by at least two other expressions.

20. The method of claim 17, wherein the logical set operation includes an intersection operation, which evaluates at least one virtual identifier appearing in the result of each one of at least two other expressions.

21. The method of claim 17, wherein the logical set operation includes a difference operation, which evaluates at least one virtual identifier appearing in the result of a first other expression but not a second other expression.

22. The method of claim 17, wherein the logical set operation includes an inverse, which evaluates at least one virtual identifier not appearing in the result of the other expression.

23. The method of claim 17, wherein at least one other expression consists of a single identifier identifying a mask namespace comprising at least one virtual identifier.

24. The method of claim 13, wherein the at least one virtual identifier within the mask comprises a plurality of virtual identifiers.

25. The method of claim 24, wherein the plurality of virtual identifiers correspond to first identifiers declared within a plurality of namespaces.

26. The method of claim 24, wherein the plurality of virtual identifiers correspond to first identifiers declared within a single namespace.

27. The method of claim 13, wherein the source comprises a source namespace.

28. The method of claim 27, wherein the host namespace is identical to the source namespace.

29. The method of claim 27, wherein the host namespace is different from the source namespace.

30. The method of claim 27, wherein the mask namespace comprises a first syntax; and the source namespace comprises a second syntax, different from the first syntax.

31. The method of claim 27, wherein the source namespace comprises a second syntax; and the host namespace comprises a third syntax, different from the second syntax.

32. The method of claim 27, wherein providing the at least one source namespace comprises providing a plurality of source namespaces.

33. The method of claim 32, wherein different implementations of the at least one virtual identifier are definable by each of the plurality of source namespaces.

34. The method of claim 13, wherein the at least one source comprises an external evaluatable expression for identifying at least one implementation source corresponding to the at least one virtual identifier.

35. A method of implementing and extending identifiers belonging to existing namespaces, comprising:
providing a declaration of an abstract identifier within an existing namespace;
providing an implementation for the abstract identifier within a second namespace, wherein the second namespace is different from the existing namespace; and
binding the abstract identifier declared within the existing namespace to the implementation within the second namespace, wherein the abstract identifier declared within the existing namespace is extendible by the implementation of the abstract identifier declared within the second namespace.

36. The method of implementing and extending identifiers of existing namespaces of claim 35, wherein the existing namespace has an existing syntax; and the second namespace has a second syntax, different from the existing syntax.

37. The method of implementing and extending identifiers of existing namespaces of claim 35, wherein the binding comprises:
identifying the qualified name of the abstract identifier declared by the existing namespace; and
enclosing the qualified name of the identifier declared by the existing namespace within a parenthetical construct.

38. The method of implementing and extending identifiers of existing namespaces of claim 37, wherein the binding further comprises binding the abstract identifier declared within the second namespace within the scope resulting from the binding of the abstract identifier declared within the existing namespace to the implementation of the second namespace.

39. The method of implementing and extending identifiers of existing namespaces of claim 35, wherein the abstract identifier within the existing namespace includes an existing implementation definable by the existing namespace that is extendible by the abstract identifier declared within the second namespace.

* * * * *